Figure 1:
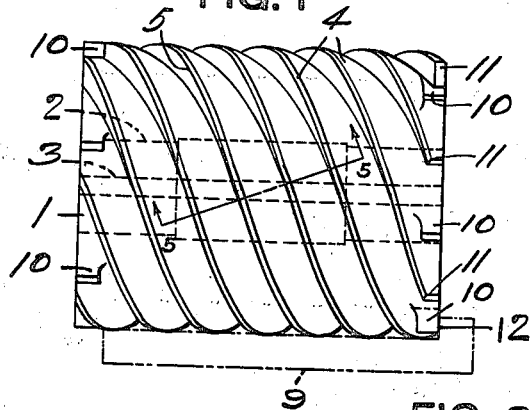

J. M. RICHARDS.
CUTTER.
APPLICATION FILED APR. 10, 1914.

1,252,495.

Patented Jan. 8, 1918.
2 SHEETS—SHEET 1.

J. M. RICHARDS.
CUTTER.
APPLICATION FILED APR. 10, 1914.
1,252,495.
Patented Jan. 8, 1918.
2 SHEETS—SHEET 2.
FIG. 6
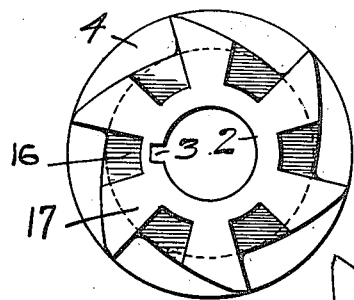
FIG. 7
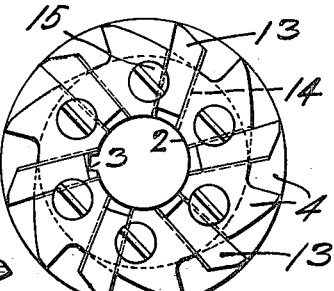
FIG. 9
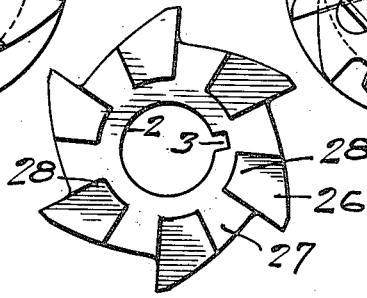
FIG. 10
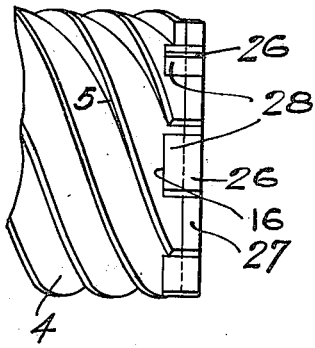
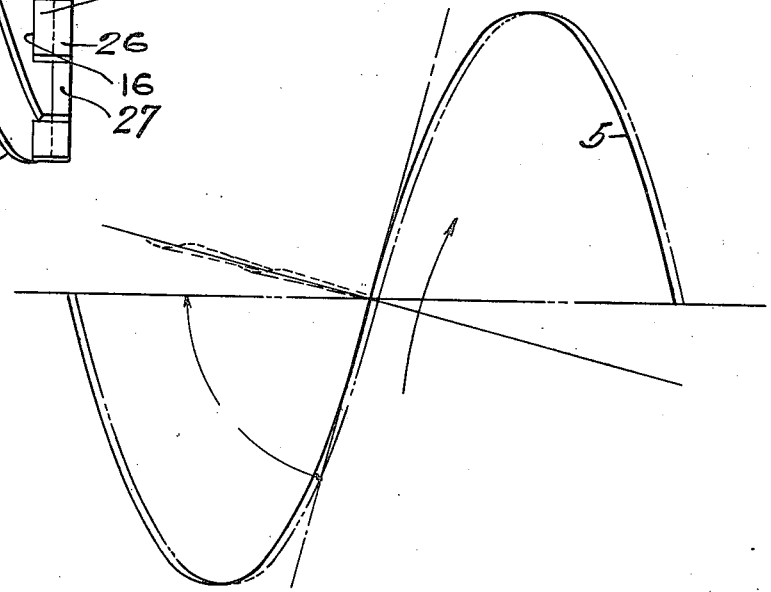
FIG. 8
WITNESSES
J. R. Keller
S. F. Armstrong
INVENTOR
John M. Richards

UNITED STATES PATENT OFFICE.

JOHN M. RICHARDS, OF BEAVER FALLS, PENNSYLVANIA, ASSIGNOR OF ONE-FOURTH TO ABRAHAM RASNER, OF PITTSBURGH, PENNSYLVANIA, ONE-FOURTH TO ALBERT W. FRANCIS, OF BEAVER FALLS, PENNSYLVANIA, AND ONE-FOURTH TO EDWIN M. S. YOUNG, OF CRAFTON, PENNSYLVANIA.

CUTTER.

1,252,495.

Specification of Letters Patent.  Patented Jan. 8, 1918.

Application filed April 10, 1914. Serial No. 830,879.

*To all whom it may concern:*

Be it known that I, JOHN M. RICHARDS, a citizen of the United States, and resident of Beaver Falls, in the county of Beaver and State of Pennsylvania, have invented a new and useful Improvement in Cutters; and I do hereby declare the following to be a full, clear, and exact description thereof.

My invention relates to cutters and is particularly, though not exclusively concerned with so-called milling cutters, or cutters used in milling machines for machining metal parts.

All cutters for this purpose heretofore known to me have had the cutting blades or edges arranged at, or substantially at, right angles to the line of cut; that is to say, the series of blades or cutting edges were arranged successively around a cylindrical body and in lines extending substantially parallel or nearly so, with the axis of the body. As a result of this arrangement, the cutters chip out the material to be cut away, instead of having a shearing action.

This arrangement of the blades has several disadvantages.

First,—The cutting edges soon become dulled; also, owing to the severe wear upon them, the cutter must be made of a much higher grade of metal, as high speed steel.

Second,—If a cut of any considerable depth is attempted, much greater power is required to drive the cutter for the same depth of cut than is necessary with my improved cutter.

Third,—The tool or cutter chatters, which not only results in hard usage of the cutter, but also of the machine in which it is operated.

My invention has for its object, therefore, the overcoming of these defects, and furthermore, the production of a cutter which will cut away considerably more material at one pass than is possible with the old form of cutter, requires less power to operate, runs comparatively noiselessly, and during the operation of which, the cutting edges are subjected to very much less wear, and therefore may be used for a much longer period, without re-grinding.

A further object is to provide means whereby the cutter may be made, in the main, of considerably cheaper material, such as a regular carbon tool steel, and may be provided at the parts where the wear is greatest, such as the ends of the cutter which cut out an angle in the material, with wear resisting cutting elements, of high speed steel. By this means, a cutter of my improved form, if made of regular carbon tool steel, will be found to be as durable as cutters of the old form made entirely of high speed steel.

Figure 2:
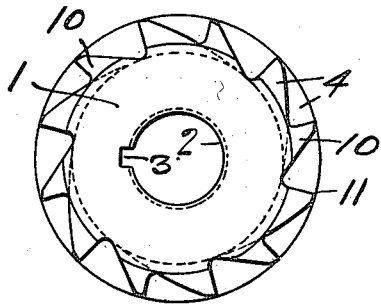
Figure 3:
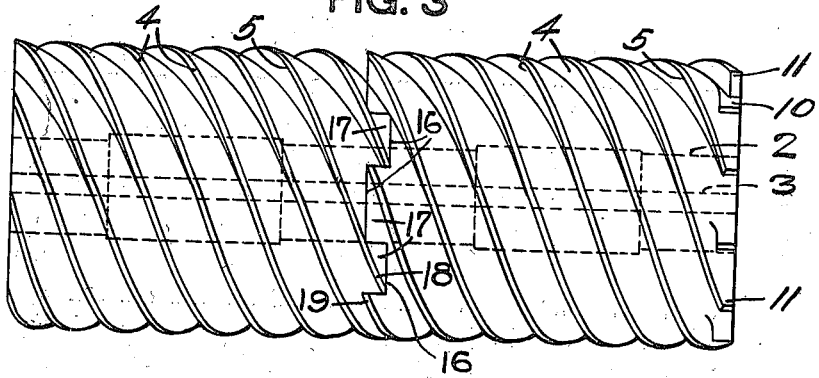
Figure 4:
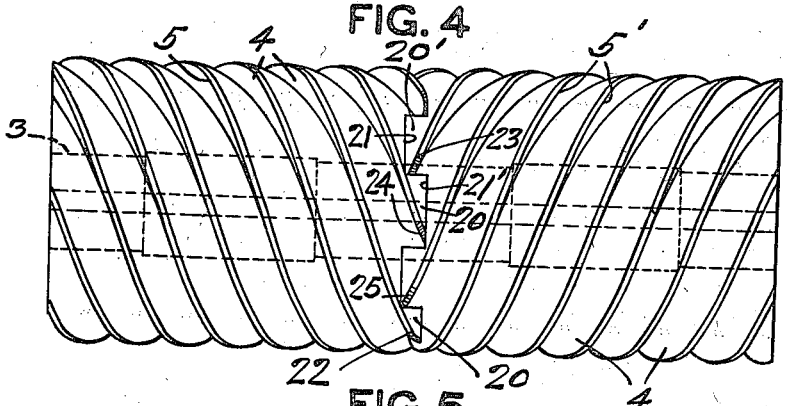
Figure 5:
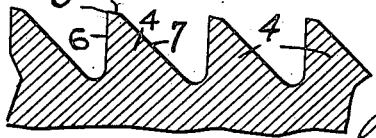

Other objects and advantages will appear from the following description of preferred embodiments of the invention, which embodiments are illustrated in the accompanying drawing, in which Figure 1 is a side elevation of the cutter, Fig. 2 is an end view thereof, Fig. 3 is a side elevation of a gang cutter or one in which two or more cutters are united to cut over an increased area at one pass. Fig. 4 is a view similar to Fig. 3, showing a modification of the construction. Fig. 5 is a fragmentary sectional view on the line 5—5, Fig. 1, illustrating the preferred shape, in cross section, of the cutting blades. Fig. 6 is an end view of a cutter having an interlocking end for the purpose of operating as one section of a gang cutter or for receiving auxiliary cutters to make a clean, right angle cut. Fig. 7 is a view showing auxiliary cutter blades separately inserted in the end of the cutter. Fig. 8 is a diagrammatic view graphically illustrating the arrangement and mode of operation of one of the cutting edges. Fig. 9 is an end view of a modified arrangement of the auxiliary cutting blades, and Fig. 10 shows said blades attached to the main cutter.

Referring to Figs. 1 and 2, the cutter in the form here illustrated, consists of a cylindrical portion 1, bored at 2 to fit the arbor or shaft of the milling machine, and having a key-way 3 by which it may be keyed to said arbor. Spirally arranged on the cutter body are the cutting blades 4—4, etc. These blades, as shown in Fig. 5, preferably have the cutting edges 5 formed by a wall 6, whose radial elements are substantially at right angles to the axis of the cutter, and a wall 7 arranged at a considerable incline to the axis. The blade preferably is truncated slightly, as at 8, to strengthen it adjacent the cutting edge and increase its wear resisting qualities.

Referring to Fig. 8, which shows approximately the preferred construction and arrangement of the cutting edge, it will be seen that this edge 5 follows a spiral path, of comparatively low pitch, around the body of the cutter, or, in other words, at a considerable angle to the axis of the cutter. The result of this arrangement is that the cutting edge has entirely a shearing action on the work and does not strike the work abruptly, as is the case with cutters whose edges are arranged approximately parallel to the axis. This arrangement of the cutting edge has several advantages.

In the first place, by arranging a number of cutting edges in close relation, as illustrated in Figs. 1 to 5, each cutting edge operates on a comparatively small portion of the working area at one time and the shearing action of one cutting edge is taken up gradually and smoothly by the next successive edge, from side to side of the work. From this, it results that a very considerably deeper cut with less expenditure of power may be made at one pass of the cutter than is possible with cutters in which the blades are approximately parallel with the axis.

Furthermore, the active portion of each blade is constantly in contact with the work, which eliminates all tendency of the cutter to chatter. Again, as the cutting action is entirely a shearing action, the cutting edges wear much less rapidly, and the tool may be used for a considerably longer time, without re-grinding.

By reason of the shearing action of this cutter, it is found in practice that the table feed and the speed of the cutter may be much more rapid than would be the case with a cutter of ordinary construction for the same depth of cut, thus greatly increasing the amount of work that may be turned out in a given time.

While I have illustrated graphically in Fig. 8, an arrangement of the cutting edge at a certain definite angle to the axis of the cutter, it is to be understood that my invention is not limited to this particular angle, but that the arrangement may be altered within any limits which will permit the cutting edge to cut the material by a shearing action, as distinguished from a chipping blow.

In order to cut out a clean angle in the work, such as, for example, in cutting keys, as indicated at 9, in Fig. 1, the end of the cutter is provided with a number of auxiliary cutting members 10, intermediate the ends of the main cutting blades 5; also the ends of the cutting blades 5 are preferably terminated as at 11 in lines substantially parallel with the axis, as shown in Fig. 1. The result of the combined action of the cutting blades so constructed and of the auxiliary cutting members, is that a clean cut angle 12 may be produced in the work.

In order to secure economy in the manufacture of the cutter, the body of the same may be made of regular carbon tool steel and, as illustrated in Figs. 6 and 7, the end, or ends of the cutter intended for the cutting of an angle in the work, may be provided with detachable auxiliary cutting members, such as 13, made of high speed steel. For the attachment of these auxiliary cutters in the form shown in Fig. 7, the end of the cutter body may be provided with dovetailed notches 14 adapted to receive the detachable cutting members, preferably radially, and the auxiliary cutters may be secured in place by means of screws 15 tapped into the end of the body portion, the heads of which screws over-lap these cutters. It is to be understood that such auxiliary cutters may be fitted to both ends of the cutter body for the purpose of milling channels in the work, as heretofore described.

In the construction illustrated in Fig. 3, and for the purpose of cutting over a greater area of work than is possible with a single cutter of the usual length, the cutters may be arranged in gangs of two or more, the attachable ends of each cutter being provided with locking notches 16 and locking keys or lugs 17 alternately arranged. To prevent the formation of a fin or ridge on the work at the junction of the two cutters, the terminals of the blades of each cutter will be extended over or into the locking lugs 17 as at 18, so that the adjacent ends of the cutting blades will be staggered as shown at 18—19, Fig. 3.

The spiral arrangement of the cutting blades of the cutters results in considerable draw longitudinally of the arbor when the cutter is in operation, which has a tendency to produce wear on the bearings of the arbor, and this action is increased when the cutters are arranged in gangs as illustrated in Fig. 3; that is to say, the greater length of the sectional spiral cutter necessarily results in greater drawing action. For the purpose of neutralizing this action, I may so construct and arrange the sections of the gang-cutter as shown in Fig. 4, in which the spiral blades 5 of one cutter section run in the opposite direction to the blades 5' of the adjacent section. The sections are interlocked by means of locking lugs 20 and 20' on the adjacent ends of the cutters, which fit into the locking notches or sockets 21 and 21'. In order that the cutting blades at the junction of the two sections shall not produce a fin or rib or other mark on the work, the cutting blades 5 of one section extend as at 22 on to the locking projections 20 and the blades 5' extend as at 23 on to the locking lug 20' of the other; that is to say, the ends of the blades are staggered. Furthermore, it is necessary that the ends of the blades of one cutter shall not extend too close to the blades of the other. To prevent this, the extreme ends of the blades are rounded or beveled off slightly as at 24 and 25 respectively.

The locking lugs and notches 20 and 21, as just described, provide also means for attaching the auxiliary cutter blades to the ends of the cutter in a different manner from that shown and described in connection with Fig. 7.

In the modified form, shown in Fig. 9, these auxiliary cutter blades 26 are made integral with a disk 27 having locking lugs 28 on one side, adapted to fit the locking sockets 16, Fig. 3, as shown in Fig. 10. The disk carrying the auxiliary blades may be secured in place in any desired manner.

While I have herein described several specific embodiments of the invention, it is to be understood that the same may be altered in details and relative arrangement of parts within the scope of the appended claims.

What I claim is:

1. A rotary cutter having cutting edges arranged on spiral lines and having auxiliary cutting blades at the end of the cutter.

2. A rotary cutter having a plurality of cutter blades arranged on parallel spiral lines and having auxiliary cutting blades between certain of the main blades at the ends of the cutter.

3. A rotary cutter having a plurality of cutting blades arranged on spiral lines and having auxiliary cutting blades arranged on lines parallel with the axis of the cutter and located between the main blades at the ends of the cutter.

4. A rotary cutter having a plurality of cutting blades arranged on spiral lines and having detachable auxiliary cutting blades arranged intermediate the adjacent ends of said cutting blades.

5. A rotary cutter having a plurality of cutting blades arranged to effect a shearing cut on the work and having auxiliary cutting blades at one end intermediate the main blades to cut a clean angle in the work.

6. A rotary cutter having a plurality of cutting blades arranged in spiral lines in combination with a member carrying a plurality of auxiliary cutters constructed to be locked to the main cutter with the auxiliary blades disposed between the ends of the main blades.

In testimony whereof I, the said JOHN M. RICHARDS, have hereunto set my hand.

JOHN M. RICHARDS.

Witnesses:
  JOHN F. WILL,
  J. R. KELLER.